(12) United States Patent
Kelly et al.

(10) Patent No.: US 9,305,600 B2
(45) Date of Patent: Apr. 5, 2016

(54) AUTOMATED VIDEO PRODUCTION SYSTEM AND METHOD

(71) Applicant: The Provost Fellows and Scholars of the College of the Holy and Undivided Trinity of Queen Elizabeth, Dublin (IE)

(72) Inventors: Damien Kelly, Dublin (IE); Frank Boland, Dublin (IE); Francois Pitie, Dublin (IE); Anil Kokaram, Dublin (IE)

(73) Assignee: Provost Fellows and Scholars of the College of the Holy and Undivided Trinity of Queen Elizabeth, Near Dublin, Dublin (IE)

( * ) Notice: Subject to any disclaimer, the term of this patent is extended or adjusted under 35 U.S.C. 154(b) by 395 days.

(21) Appl. No.: 13/748,727

(22) Filed: Jan. 24, 2013

(65) Prior Publication Data

US 2014/0205270 A1    Jul. 24, 2014

(51) Int. Cl.
| | |
|---|---|
| *H04N 13/00* | (2006.01) |
| *H04N 13/02* | (2006.01) |
| *G11B 27/031* | (2006.01) |
| *G11B 27/034* | (2006.01) |

(52) U.S. Cl.
CPC ............ *G11B 27/031* (2013.01); *G11B 27/034* (2013.01)

(58) Field of Classification Search
CPC ...... G11B 27/031; G11B 27/034; H04N 7/14; H04N 13/00
USPC ........................................ 348/43, 36–39, 143

IPC ............................................. H04N 13/00,13/02
See application file for complete search history.

(56) References Cited

U.S. PATENT DOCUMENTS

| | | | |
|---|---|---|---|
| 7,349,005 B2 | 3/2008 | Rui et al. | |
| 2002/0031756 A1* | 3/2002 | Holtz et al. | 434/362 |
| 2002/0196327 A1 | 12/2002 | Rui et al. | |
| 2006/0005136 A1 | 1/2006 | Wallick et al. | |
| 2007/0081814 A1* | 4/2007 | Ha et al. | 396/310 |

FOREIGN PATENT DOCUMENTS

| | | |
|---|---|---|
| GB | 2351628 A | 1/2001 |
| GB | 2409030 A | 6/2005 |
| GB | 2482140 A | 1/2012 |
| KR | 10-2005-0013461 A | 4/2005 |
| WO | 2010016059 A1 | 2/2010 |

* cited by examiner

*Primary Examiner* — Trang U Tran
(74) *Attorney, Agent, or Firm* — K&L Gates LLP

(57) ABSTRACT

The invention provides a method and system for the automated post production of a single video file, the method comprising the steps of gathering video data from a plurality of camera sources; gathering audio data from a plurality of microphone sources; using an automated tracking offline algorithm to track a sound emitting from a moving target object in a 3D space, to provide localization data of said target object to identify an optimum camera source to provide video data of said target object; and composing a composite video sequence of said moving target from a plurality of identified optimum camera sources in a single video file. The algorithm relies on both video data from multiple camera views and audio data from multiple microphone arrays to infer the 3D position of the active speaker over the duration of the captured presentation.

16 Claims, 3 Drawing Sheets

AUTOMATED VIDEO PRODUCTION SYSTEM AND METHOD

FIELD OF INVENTION

The invention relates generally to a video production system and method, and specifically to automated video production.

BACKGROUND TO THE INVENTION

The communication of information through lectures is fundamental for learning and teaching in academic institutions. Until recently, universities have only been able to offer lectures to attending students, severely restricting the university's reach to the confines of their campus. However, with advancements in technologies for transmitting multi-media over the Internet, some universities now facilitate students with live lecture participation, or facilities to view lecture recordings over the Internet. As well as on-line lectures, academic institutions have recognised the greater opportunities of the Internet for content delivery and on-line video seminar and video conference proceedings are becoming popular. Universities have embraced technology in this way not only to broaden their reach but also to meet the growing demands of students and academics who wish for greater flexibility to learning.

The efforts of universities to provide students with on-line lecture content fits into the domain of eLearning. Within eLearning, the ways in which universities are currently offering video content over the Internet fit into two categories: synchronous and asynchronous. In a synchronous manner some universities offer live video lectures to remote participants. In many cases where lecture videos are provided, students are often given the opportunity to view content in an asynchronous manner or on-demand.

Choosing to offer lectures online is a significant and costly under-taking for any academic institution. Not least of the difficulties associated with this task, is the capturing and editing of video lectures into a suitable form for presentation over the Internet. The expectation among students in relation video lectures is high. The modern student has regular exposure through the Internet and television to professionally edited video content. This sets a high level of expectation among student in relation to video lectures.

There is recent move away from traditional single camera lecture videos towards more dynamic video presentations including shots from multiple cameras. Such productions which aim to capture all visually interesting aspects of lectures are generally agreed to be much more engaging for viewers.

A key component of any lecture or seminar is the conversational interaction among participants, such as that which often occurs between a presenter and an audience. Capturing this information for inclusion in a video lecture production presently requires significant manual editing. In the case where the lecture is to be transmitted live this editing must be performed at the time of capturing usually by large production teams. In the off-line case such editing can be performed as a post-production step but also in most cases requires skilled manual editing.

Automatic systems for editing multi-camera lecture captures do exist such as that proposed by Rui et al. (U.S. Pat. No. 7,349,005). This system incorporates expert video production rules for editing multi-view video data of a lecture and also enables the capture of conversational interactions. The limitation of this system is that active speakers are only tracked in a single view at any given time. Although the system uses multiple cameras, each camera is dedicated to a specific capture task such as capturing the audience or the presenter. The problem with such a configuration is that the success of the system to capture facial view of speakers requires audience members to face a designated camera. This means that speakers are restricted to a defined seating zone which is undesirable. Furthermore, the system can only provide frontal facial views of speakers if they are orientated towards the camera assigned to track them.

It is an object of the invention to provide a system and method for the automated production of a single-view video presentation from a multi-camera capture of a lecture.

SUMMARY OF THE INVENTION

The aim of the invention is to provide an automated video editing system that tracks conversational interactions but overcomes the above mentioned limitations of existing techniques, as described in detail below. Instead of designating a single camera to track specific speakers in a lecture room, the invention uses multiple cameras to completely observe the lecture room. The system then tracks conversational interactions between speakers and extracts the most frontal view of the active speaker from the available cameras.

According to the invention there is provided, as set out in the appended claims, a method for the automated production of a single video file from a multi-view video capture, the method comprising the steps of:

i) gathering video data from a plurality of camera sources;
ii) gathering audio data from a plurality of microphone sources;
iii) using audio and video information to automatically locate and track a moving target object in a 3D space, so as to determine the region occupied by the said target object in each available camera;
iv) determining from the identified regions in each camera view, the most optimum view of said target object; and
v) composing a single view video sequence consisting of a user defined main view and an automatically inserted optimum view of said target object over the duration of the video capture.

In one embodiment the target object is a person

In one embodiment the 3D space is a lecture theatre, seminar room or auditorium.

In one embodiment there is provided the step of voxelization to spatially sample the 3D space of the tracking environment in order to determine hypothesised target object positions.

In one embodiment, each voxel represents a hypothesised target object position which is confirmed or rejected dependent on a predefined criteria.

In one embodiment, where the target object is a person, the predefined criteria comprises of a skin colour mask which is used to indicate likely regions of person occupancy.

In one embodiment there is provided the step of analysing 3D foreground denoting possible object target occupancy from which individual regions of the foreground can be determined through a 3D connect component analysis and shape analysis.

In one embodiment there is provided the step of using a 2D connected component analysis on each skin colour mask to enable individual connected 3D foreground regions to be associated with connected skin colour regions in each camera view.

In one embodiment, where the target object is a person, there is provided the step of defining an ellipsoidal head model and constraining the fitting of the ellipsoid to the 3D foreground as well as its corresponding connected skin region in each view.

In one embodiment, where the target object is a person, there is provided the step of resolving the location of the active speaker from the plurality of identified head positions using a plurality of time-delay estimates extracted from multiple pairs of microphones.

In one embodiment there is provided the step of modelling said skin colour under varying illumination.

In one embodiment said skin colour modelling step is performed for skin colour detection under conditions of low illumination.

In one embodiment there is provided the step of examining target object activity over a window of a pre-defined number of time steps centred at the current time instance to assign a high probability to target object positions which correspond to significant target object activity.

In one embodiment the said target object activity corresponds to speech activity where the target object is a person.

In one embodiment there is provided the method of using a Viterbi algorithm to obtain a Maximum a Posteriori (MAP) estimate of the path of target object activity through the identified plurality of target object positions over the duration of the audio and video capture.

In one embodiment there is provided the further step of segmenting said target object in each available view and using a best-view selection criteria to determine the most optimum segmented view displaying the target object.

In one embodiment, where the target object is a person, the best-view selection criteria is determined as the segmented head view corresponding to that in which the largest area of detected skin is visible.

In a further embodiment of the invention there is provided system for the automated production of a single video file from a multi-view video capture, the system comprising:
  i) means for gathering video data from a plurality of camera sources;
  ii) means for gathering audio data from a plurality of microphone sources;
  ii) means for using audio and video information to automatically locate and track a moving target object in a 3D space, so as to determine the region occupied by the said target object in each available camera;
  iv) means for determining from the identified regions in each camera view, the most optimum view of said target object; and
  v) means for composing a single view video sequence consisting of a user defined main view and an automatically inserted optimum view of said target object over the duration of the video capture.

There is also provided a computer program comprising program instructions for causing a computer program to carry out the above method which may be embodied on a record medium, carrier signal or read-only memory.

BRIEF DESCRIPTION OF THE DRAWINGS

The invention will be more clearly understood from the following description of an embodiment thereof, given by way of example only, with reference to the accompanying drawings, in which:—

DETAILED DESCRIPTION OF THE DRAWINGS

Figure 1:
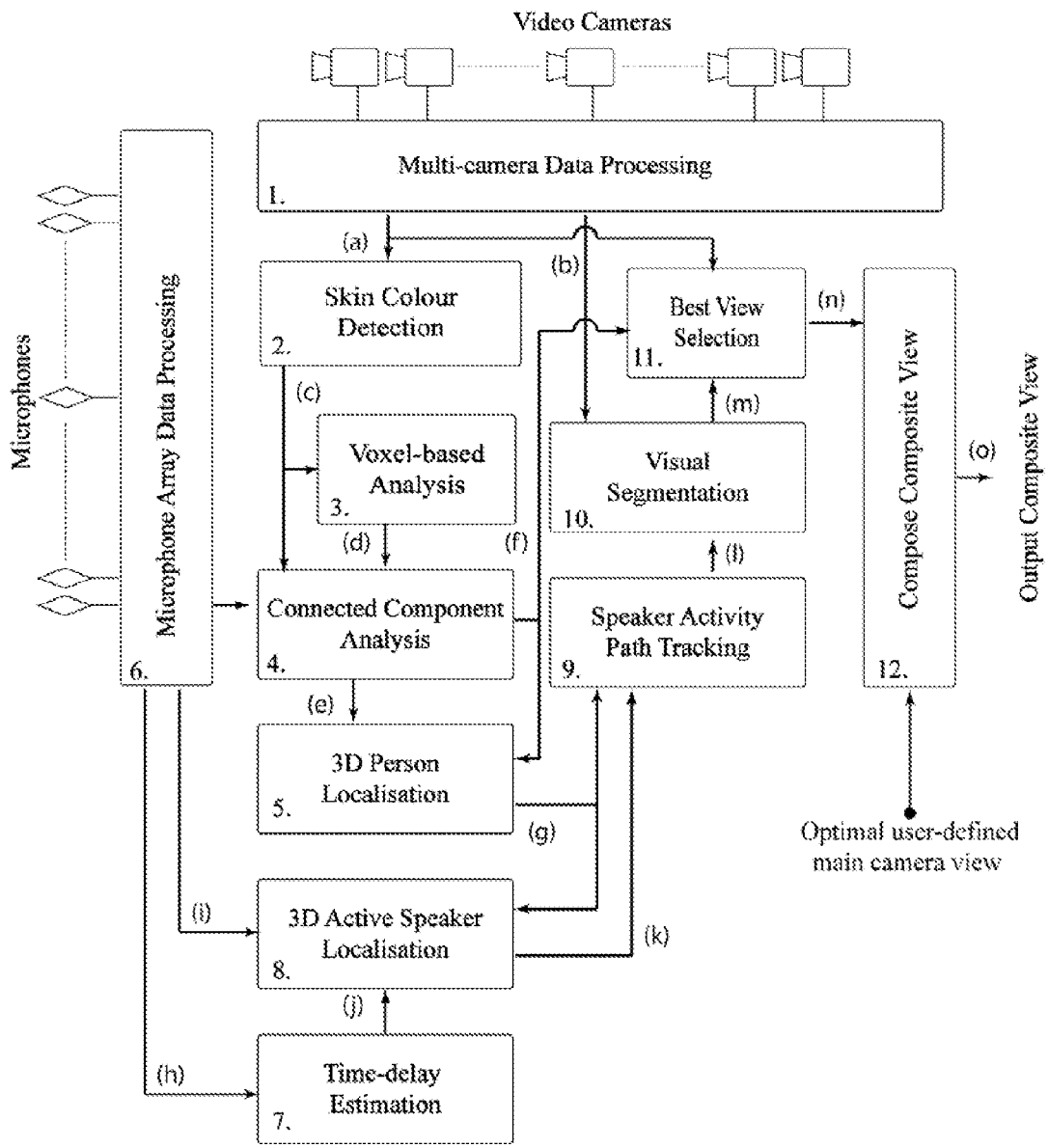
FIG. 1 illustrates a block diagram representation of the system to provide automated post production of a single video file according to one embodiment of the invention.

The following sections with reference to the included drawings present a detailed description of the invention. This description refers to one implementation of the invention detailing core aspects of the overall system. It is not the purpose of this description to limit the scope of the invention. The overall scope of the invention is specified only by the accompanying claims.

The invention comprises of a system for automatically editing multiple camera views of a lecture/seminar into a single-view video presentation. The single-view video presentation produced by the system consists of a user-defined main view and an automatically inserted view of the current active speaker. As such, the system includes a method for automatically locating and tracking the current active speaker over the duration of the captured footage. In addition to this, the invention incorporates a technique for extracting the best view of the tracked speaker ensuring that the most frontal facial view of the speaker is included in the single view video output.

The single-view video output of the system consists of a user-defined main view and an automatically inserted best view of the current active speaker. The inserted view of the active speaker acts as a virtual camera whereby it simulates the active tracking of conversational interactions between people. For example; in a lecture scenario, the system will automatically determine the best view of the lecturer's face while they are talking. However, if an audience member asks a question, the system will determine a best facial view of the audience member for the duration of the question. Once the audience member has finished speaking, the camera will then return to tracking the lecturer. The best view composed by the system is determined by analyzing all views in which the track speaker is visible.

This level of video editing, which includes people tracking and best-view selection, currently requires significant manual intervention. This is a time consuming process which is costly since it requires skilled video editing teams. The invention is aimed towards alleviating the overhead required to generate effective video lectures for distribution over the Internet either for on-line or off-line viewing. For the off-line case, the system can perform the editing task as a post-production step. In the online case the system can be employed for automated editing as the footage is being captured. When the system is used for on-line editing however, the output is generated with a small time-delay relative to the time of capture.

To track people who are speaking, the system uses audio data from multiple microphones and video information from multiple cameras. The use of multiple camera views is important to the invention since it identifies potential speaker locations in the 3D space of the lecture/seminar room. In order to track speakers in 3D space the system requires the use of at least two cameras with over-lapping fields of view.

Using the tracked 3D location of the active speaker, the system identifies from the available cameras, multiple views of the speaker's face. The system chooses from these multiple views, the best facial view of the tracked speaker for inclusion in the video output. The best view is selected using visual appearance based rules and ensures that the most frontal facial view is selected.

Referring now to the Figures and initially FIG. 1, FIG. 1 illustrates a block diagram of the invention. The following text describes the blocks which form one embodiment of the system.

(1) Multi-Camera Data Processing

Block (1) in the diagram of FIG. 1, referred to as Multi-camera Data Processing, is responsible for the task of preparing the multi-view video data for use by the system. This component handles the capturing of the current frame from each of the available cameras. The algorithm requires that the tracking area is captured by at least two cameras with overlapping fields of view. A typical configuration for the system employed in a rectangular room, consists of four cameras in each corner orientated over the room's centre. There is no restriction on the maximum number of cameras to which the algorithm can be applied. Additional cameras can be added or removed from the system depending on specific requirements and available hardware resources. For instance, more than four cameras may be necessary to completely service a lecture room which is very large or irregularly shaped.

For the purpose of description it is useful to define a video frame captured at time t from camera n in the configuration as $I_n$. The total set of video frames available to the system at time t therefore is $I=\{I_1, \ldots, I_{N_{cam}}\}$ where $N_{cam}$ is the total number of cameras.

It is within block (1) that any necessary pre-processes may be applied the video data I such as gamma correction, colour correction or brightness/contrast adjustments. The algorithm does not rely on any video pre-processing but some pre-processes may be necessary to compensated for hardware related capture quality issues. In normal circumstances the raw video data is used. The only requirement of the algorithm is that the video data is of a RGB colour format. Conversion to RGB is necessary where the video data is captured in some other colour format.

The system also requires that the cameras are fully calibrated within the tracking environment such that the intrinsic and extrinsic calibration parameters for each camera are known. Any existing automatic, semi-automatic or manual technique for camera calibration can be used. However, the accuracy of the estimated calibration parameters will have a limiting effect on the accuracy of the speaker tracking system. Once this information is determined, a projection operator $P_n(\bullet)$ can be defined for camera view n to map any 3D point X in the lecture room to a pixel location $p_n$ in that view such that, $$p_n = p_n(X). \quad (i)$$

Based on the calibration information, the system maintains a projection operator for each camera in a set $P=\{P_1(\bullet), \ldots, P_{N_{cam}}(\bullet)\}$.

Two outputs are provided by block (1) within the system. These outputs are;

(a) A set of video frames $I=\{I_1, \ldots, I_{N_{cam}}\}$ at the current time instance t from $N_{cam}$ available camera views. The total number of available views must be $N_{cam} > 2$.
(b) A set of projection operators $P=\{P_1(\bullet), \ldots, P_{N_{cam}}(\bullet)\}$ defining a projection operator for each of the $N_{cam}$ camera views.

(2) Skin Colour Detection

The system requires a skin mask to be determined for each video frame generated in the output of (a). Skin colour modeling is used to generate a binary mask indicating regions of skin and non-skin in each of the video frames contained in the set of video frames I. The lecture room setting presents a difficult scenario for skin detection since it is often the case that skin regions such as faces are captured under low illumination. This is normally the case particularly over audience regions. A suitable skin-colour model must therefore account for the variation of skin colour over varying level of luminance.

Most existing skin colour modeling techniques transform pixel data into chrominance colour spaces to decouple chromatic colour from that of luminance. Once the chromatic colour information is obtained the luminance component is usually discarded. Skin colour is then modeled using only the chromatic colour information. Such methods assume that in a chrominance colour space, skin-tone is independent of the luminance component.

One of the difficulties with skin colour modeling is that it varies non-linearly with respect to luminance. Typically, the transformation of skin colour into chrominance colour spaces does not adequately account for this non-linear relation. As a result the accuracy of a skin colour model using chrominance information can be inconsistent over the luminance range. Using such skin colour models for skin detection can result in poor performance in the low luminance range.

The particular skin detection method employed by the system, utlises a novel technique for modeling skin colour over varying luminance. The new method aims to capture the non-linear dependence of skin-tone on luminance using RGB colour information only and does not require any colour space transformations. This new model of skin colour is formed by learning a suitable model using a training-set of RGB skin colour pixels corresponding to values of low-to-high luminance. In this way an estimated skin-tone can be made for any observed level of illumination.

The modeling technique is defined as follows. Consider a pixel p in frame n with red, green and blue intensity values of R, G and B respectively. The R component is nonlinearly related to the B and G components using two polynomials $f_G(R)$ and $f_B(R)$ whereby, $$f_G(R) = a_k R^k + a_{k-1} R^{k-1} + \ldots + a_1 R + a_0 \quad (ii)$$

$$f_G(R) = b_k R^k + b_{k-1} R^{k-1} + \ldots + b_1 R + b_0 \quad (iii)$$

and k is the order of the polynomial. The order of the polynomials can be altered depending on the amount of training data available to the system or as additional training data is supplied to the system.

With polynomial relations defined in Equations (ii) and (iii), the classification of a pixel p as skin is defined by two conditions $C_1(p)$ and $C_2(p)$ where, $$C_1(p) = (|G - f_G(R)| < t_0) \cap (|B - f_B(R)| < t_1) \quad (iv)$$

and $$C_2(p) = (R/G < \beta) \cap (R/B < \beta). \quad (v)$$

with $t_0$, $t_1$ and $\beta$ being pre-defined threshold values. Using the conditions of Equations (iv) and (v) a binary skin colour mask for view n is defined as, $$S_n(p) = \begin{cases} 1 & \text{for } C_1(p) = \text{true}, C_2 = (p) = \text{true} \\ 0 & \text{Otherwise} \end{cases} \quad (vi)$$

Equivalently, the binary skin colour mask of Equation (vi) defines a set of $K_n$ pixels, $$p_{ns} = \{p_{n1}, \ldots, p_{nK_n}\} \quad \text{(vii)}$$

in view n which are classified as skin.

The resulting output of skin detection in block (2) is;
(c) Binary skin colour masks $S_n(p)$ and set of skin colour pixels $p_{ns}$ for $n=1, \ldots, N_{cam}$, indicating skin and non-skin colour pixels for each of the video frames contained in output (a).

(3) Voxel-Based Scene Analysis

Voxel-based analysis refers to the method of sampling the 3D space of the lecture room and relating these 3D locations to the video data to determine occupied regions in space. The concerned invention uses voxelization in block (3) to determine regions occupied by skin in the 3D space of the lecture room. In order to apply voxelization, the system must be supplied with a pre-defined sampling resolution for the x, y and z dimensions of the lecture room. The default installment of the system uses a 0.05 m sampling interval in each dimension. Under this configuration, a single voxel represents a volume of (0.05 m*0.05 m*0.05 m) in space.

The tracking region can be pre-defined by the user of the system if necessary and it is possible to restrict the system to only track within certain zones. This enables the user to define a custom region-of-interest within the lecture room representing a tracking zone. Without any user intervention, the default tracking zone corresponds to the volume of space where the field-of-view of at least two of the available cameras overlap. The facility to pre-define a tracking zone can also be useful to reduce the computational requirements of the system. For instance, in a normal lecture setting the best deployment of the system is to define a tracking zone to only cover the height range of a standing or seated person. Typically, regions above 2.0 m and below 0.8 m can be omitted from analysis by the system in this case since a person's head is not likely to be detected outside of this range.

The result of the process of voxel analysis in block (3) provides the system with a set of known 3D locations $X_j$, $j=1, \ldots, R$, defining the centroid of R voxels in space. The locations $X_j$ define a tracking zone in which speakers are to be tracked.

Using the projection operators defined in output (b) of block (1) the centroid of each voxel is projected into the 2D view of each camera. In order to ease the computational burden of this analysis, the system performs a once-off projection of each voxel centroid to its corresponding pixel location in each camera view. The system then maintains in memory, look-up-tables defining mappings of voxel locations to pixel locations for each camera view. Since the configuration of cameras is un-restricted, it is possible some voxel regions will not be visible in all camera views. The look-up tables which the system maintains, also records additional information for each voxel such as its visibility in each view. A voxel is deemed visible in a camera view only if its corresponding pixel location is within the bounds of the camera's resolution. For instance, for a video camera with a resolution of 640*480, if the projection of a voxel into this view results in a pixel location outside of the known pixel resolution, then it is classified as not visible in that view.

With the voxel-to-pixel mappings defined by the system, a binary decision of occupancy is made for each voxel using the $N_{cam}$ skin colour masks $S_n(p)$, obtained through output (c). If the pixel location of a voxel in two or more video frames is found to occupy a location classified as skin, then that voxel is classified as occupied. Otherwise, the voxel location is deemed to be unoccupied. For example, a voxel with associated pixel locations of $p_n$ for $n=1, \ldots, N_{cam}$, is classified as occupied if, $$\sum_{i=1}^{N_{cam}} S_n(p_n) > 2 \quad \text{(viii)}$$

The result of this analysis is a set $X_o = \{X_1, \ldots, X_{K_V}\}$ of $K_V$ occupied voxels within the space of the lecture room. These occupied voxels represent 3D volumes in space occupied by skin thus indicating the likely location of faces. This set of occupied voxels is later used by the system to infer likely head locations within the lecture room. The output of the voxel-based analysis in block (3) is;
(d) A set $X_o$ of occupied voxels defining regions of skin in the tracking zone of the lecture room.

(4) Connect Component Analysis

Since a single voxel only represents a small volume of space, it is likely that multiple closely positioned voxels will occupied by skin at locations corresponding to faces. As a consequence, it can be assumed that single isolated occupied voxels are unlikely to represent head locations and more likely due to hands, arms or inaccurate skin colour detection. Such small skin regions are discarded by the system for analysis. To perform this task, it is necessary to sub-divide the set $X_o$ of occupied voxels from output (d) into separate groups of connected voxels representing more compact occupied regions. The system employs a connected component analysis to group occupied voxels based on their relative proximity to other occupied voxels. Once this analysis has been completed the system ranks each connected voxel region based on its size and removes the smallest connected regions containing only one voxel.

The above steps are necessary so as to filter skin regions corresponding to non-faces from the voxel data. In brief, a 3D connected component analysis on the voxel data $X_{o'}$ is employed to define a set $X_c\{X_{c1}, \ldots, X_{cK_v}\}$ of $K_v$ connected occupied voxel groups.

In a similar manner to the above, the system uses connected component analysis to identify possible face locations from the skin colour masks of each view. This acts to sub-divide the output (c) into groups of connected skin colour pixels. This results in transforming the set $P_{ns}$ of view it from Equation (vii) into $P_{ns} = \{P_{n1}, \ldots, P_{nK_{nS}}\}$ containing $K_{nS}$ groups of connected skin pixel regions.

Two outputs are generated by the connected component analysis block in the system. These are;
(e) $K_V$ groups of connected occupied voxels defined in a set $X_c$.
(f) $K_{nS}$ groups of connected skin colour pixels in view n defined in a set $P_{nc}$.

(5) 3D Person Localisation

Using the set of connected voxel groups and connected pixel groups it is necessary to identify head locations within these occupied regions. An ellipsoidal head model is defined based on the average size of a person's head. The system assumes a default ellipsoidal head model with axes in the x, y and z dimensions of 0.194 m, 0.145 m and 0.241 m respectively. The head model has four degrees of freedom; three degrees of freedom corresponding to a 3D translation and one degree of freedom corresponding to a rotation in the xy plane.

In block (5) of the system connected voxel regions $X_c$ are associated with their corresponding connected 2D skin colour regions within the sets $P_{nc}$. Once this is determined, the head model is fitted to each connected voxel regions in $X_c$ as well as its corresponding connected 2D skin colour region in $P_{nc}$. When fitting the head model to a group of connected voxels, the fitting process ensures that the estimated location and rotation of the head best describes the observed shape of both the voxel and skin mask data. Once the head model has been fitted to each group of occupied voxels in $X_c$ block (5) outputs;

(g) A set $x=\{x_1, \ldots, x_{K_n}\}$ of head centroid positions and a set $r=\{r_1, \ldots, r_{k_p}\}$ of corresponding values of head rotation in the x-y plane.

(6) Microphone Array Data Processing

Microphone array data processing relates to pre-processing tasks such as filtering which are applied to the available audio streams before being utilised by the system. These pre-processes can be applied to remove channel noise, or background noise sources. Additional band-pass filtering (in the speech frequency range of approximately 400 Hz-5000 Hz) can be applied to accentuate the speech content of the signals.

The default configuration of the system uses the raw multi-channel audio data captured by the multiple microphones. However, the necessary audio pre-filtering is hardware specific and also dependent on the noise conditions of the tracking environment or noise floor associated with the audio hardware. In general, in noisy tracking environments, noise filtering and speech band-pass filtering will help to improve the task of time-delay estimation later described in block (7).

The system also requires knowledge of the positions of the microphones within the lecture room. This information can be obtained by manual measurement or existing automatic or semi-automated microphone calibration techniques. Using the positions of the microphones, the system determines a projection operator $M_m(\bullet), m=1, \ldots, N_{mic}$ for each of the $N_{mic}$ microphone pairs utilized by the system. The projection operator $M_m(\bullet)$ enables the expected time-delay r observed at microphone pair m to be determined for a speech source signal emitted at any 3D location X i.e, $$\tau = M_m(x). \qquad \text{(ix)}$$

The system maintains a set of these projection operators in a set $M=\{M_1(\bullet), \ldots, M_{N_{cam}}(\bullet)\}$: one for each available pair of microphones.

The pre-processing of the audio data results in the generation of two outputs;

(h) Pre-filtered, multi-channel audio data.

(i) The set of projection operators $M=\{M_1(\bullet), \ldots, M_{N_{cam}}(\bullet)\}$ relating points in 3D space to expected time-delay values at all pairs of microphones.

(7) Time-Delay Estimation

The algorithm for tracking the current active speaker relies on obtaining estimates of time-delays between speech signals received at multiple spatially separated microphones. Mathematically, a signal s(t) at time t received at two spatially separated microphones can be represented as, $$x_1(t) = a_1 s(t) + v_1(t) \qquad \text{(x)}$$

$$x_2(t) = a_2 s(t+\tau) + v_2(t) \qquad \text{(xi)}$$

where $a_1$ and $a_2$ represent the source signal attenuation factors at the microphones and $v_1(t)$ and $v_2(t)$ denote noise sources. Using this representation, the time-delay $\tau$ between the received signals can be estimated using Generalized Cross-Correlation. The Generalized Cross-Correlation method defines the time-delay estimate as, $$\hat{\tau} = \underset{\tau}{\operatorname{argmax}}\ R_{x_1 x_2}(\tau) \qquad \text{(xii)}$$

where $R_{x_1 x_2}(\tau)$ is the generalized cross correlation function defined as $$R_{x_1 x_2}(\tau) = F^{-1}\{\psi(w) G_{x_1 x_2}(\omega)\} \qquad \text{(xiii)}$$

with $F^{-1}\{\bullet\}$ defining the inverse Fourier transform, $G_{x_1 x_2}(\omega)$ the cross power spectrum of $x_1(t)$ and $x_2(t)$ and $$\psi(w) = |G_{x_1 x_2}(\omega)|^{-1}. \qquad \text{(xiv)}$$

This is known as the phase transform generalized cross-correlation approach to time-delay estimation. Using Equation (xii), the relative time delay between each pair of microphones available to the system can be determined to generate a set of time-delay estimates $\hat{\tau}_t$, at time t. The algorithm also estimates time-delays at the previous time step t−1 and the next time step t+1. Therefore time-delay data is analysed by the system over a window of three time-step. In order to estimate delays at time t+1 the system operates at a delay of one time-step relative to the current time t. Each set of and $\hat{\tau}_{t-1}, \hat{\tau}_t$ and $\hat{\tau}_{t+1}$ contains one time-delay estimate for each pair of microphones.

The output of block (7) is:

(j) Three sets of time-delay estimates $\hat{\tau}_{t-1}, \hat{\tau}_t$ and $\hat{\tau}_{t+1}$ at time steps t−1, t and t+1 respectively.

(8) 3D Active Speaker Localization

The task of 3D active speaker localization builds a probabilistic likelihood function over the estimated head positions x from output (g) based on the time delay estimates $\hat{\tau}_{t-1}, \hat{\tau}_t$ and $\hat{\tau}_{t+1}$. In building the likelihood function the system uses the projection operators of Equation (ix) to evaluate the expected set of time-delays observed at the microphones due to a speaker at every head position in the set x. The likelihood function is then formed over the set of head position based on how closely the expected time-delays match the time-delay estimates $\hat{\tau}_{t-1}, \hat{\tau}_t$ and $\hat{\tau}_{t+1}$.

Since the system analyses time-delays over three time instances eight possible states of speaker activity are possible for each head location. These states of speaker activity s(t) are summarized in FIG. 2. A location is deemed to relate to a specific state of speaker activity based on how the expected time-delays at the location correspond to the time-delay estimate $\hat{\tau}_{t-1}, \hat{\tau}_t$ and $\hat{\tau}_{t+1}$. For example, if for some head position the expected time-delays match the time-delay estimates over the three time steps t−1, t and t+1 then the speaker activity state for that location is s(t)=[1,1,1].

The likelihood of a head location corresponding to a particular state of speaker activity is defined by the system as being proportional to the number of microphone pairs where a match for that state of speaker activity is observed.

By this, a probabilistic likelihood function $$p(\hat{\tau}_{t-1}, \hat{\tau}_t, \hat{\tau}_{t+1} | x(t), s(t)), \qquad \text{(xv)}$$

is defined. In this definition, the notation x(t) and s(t) is used to show the dependence of both the speaker location x and speaker activity state s on time.

The likelihood function is then output through;

(k) A probabilistic likelihood function over each estimated head location in x for each possible state of speaker activity s.

(9) Speaker Activity Path Tracking

Figure 2:
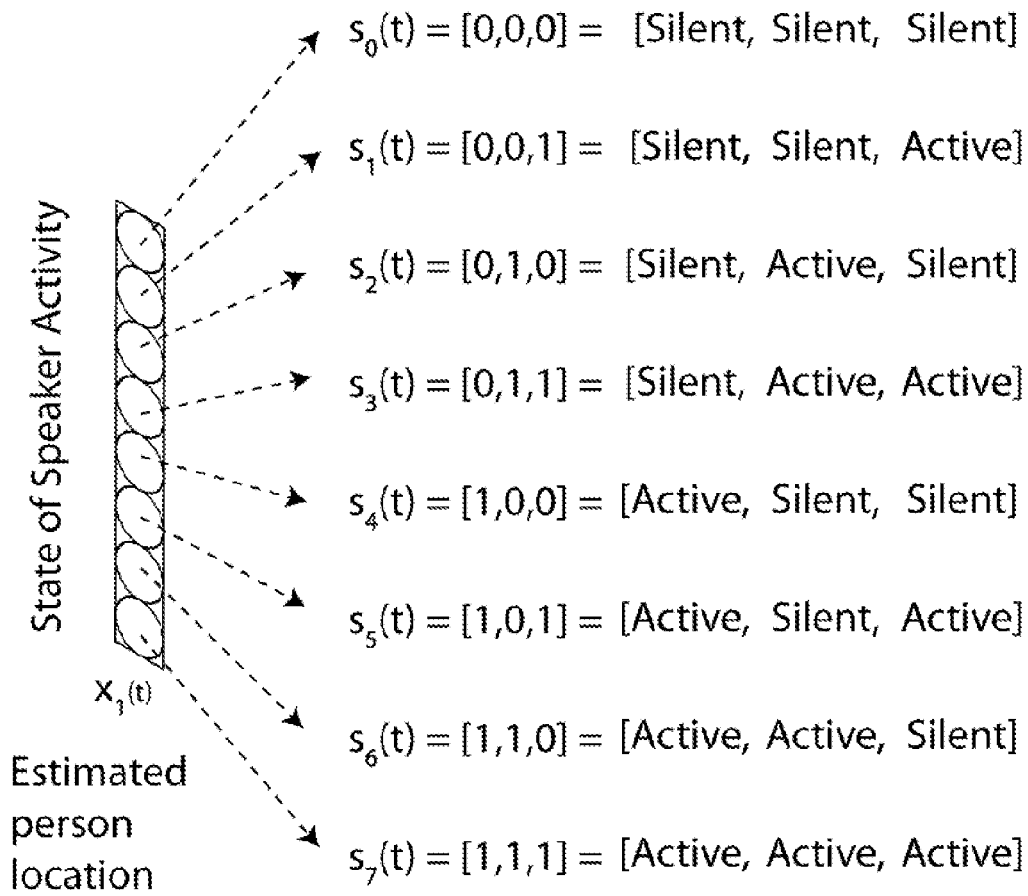
FIG. 2 is a visual illustration of the eight possible states of speech activity which the system considers for speakers tracked by the system.
Figure 3:
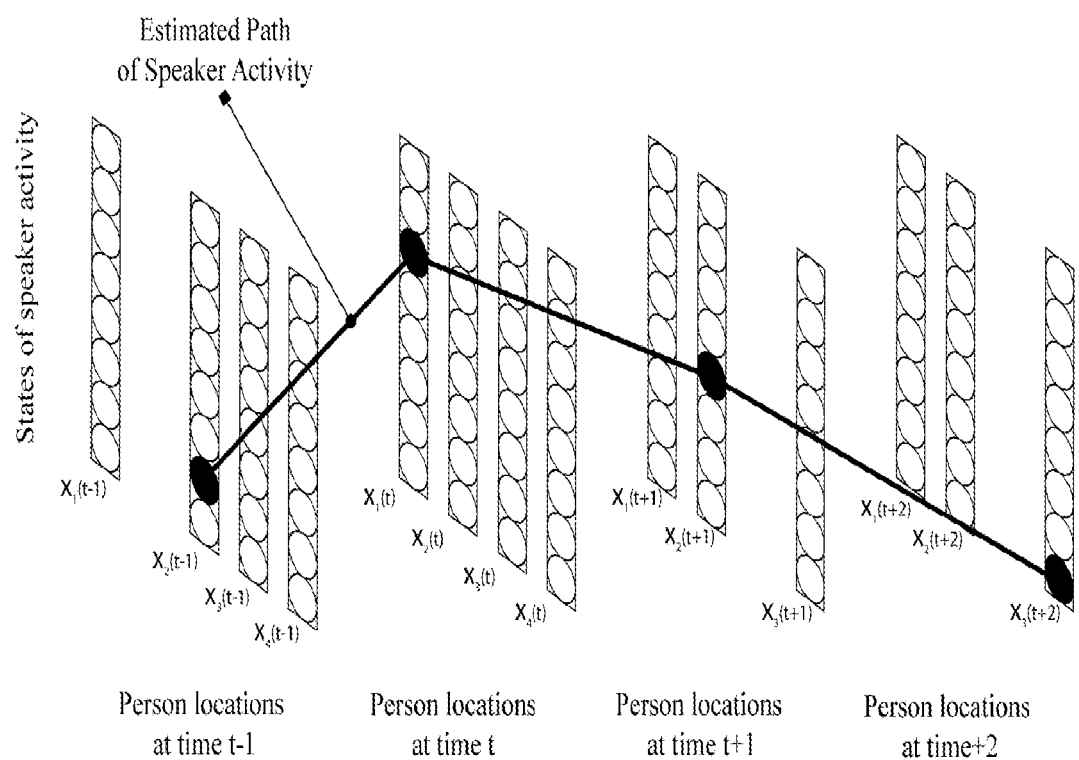
FIG. 3 illustrates an example of an estimated path of speaker activity through the set of speakers locations and speaker activity states using the Viterbi algorithm.

The tracking of the active speaker through the set of estimated head positions requires the definition of two priors p(x(t)|x(t−1)) and p(x(t)|s(t)). The first prior p(x(t)|x(t−1)) defines a motion model for the active speaker. This is set to best reflect the expected motion of active speaker being tracked by the system. The second prior p(x(t)|s(t)) defines a prior probabilistic weighting on a head position x(t) being the location of the active speaker given the speaker's state of speech activity. This prior is used to place a low weighting on states of speaker activity containing silence. For instance, the system ensures that speech activity states such as s(t)=[0,0,0] are given a low prior weighting in the tracking algorithm. Given that the set of possible speaker positions x and speaker activity states s are both discrete, the tracking space can be represented as a 3D trellis. This is illustrated in FIG. 3. Using the, two priors and the likelihood obtained through output (k), the system employs the Viterbi algorithm to jointly estimate the speaker's location and state of speech activity at each time step. This joint estimate at each time step is referred to as the speaker activity path. An example speaker activity path through the 3D trellis structure of the tracking space is illustrated in FIG. 2. The Viterbi algorithm operates over a temporal window of the observed audio and video data. In the offline case, the temporal window used by the system consists of the complete duration of the captured data. When the system is implemented on-line however, a smaller temporal window about the current time is used. The estimation of speaker locations over a temporal window means that speakers are tracked at a time slightly delayed relative to the current time.

The output of block (9) in the system is;

(l) Joint estimate of speaker location and speech activity over a temporal window.

(10) Visual Segmentation

With the location of the active speaker define in (l), the system uses the camera projection operators of Equation (i) to determine the head location and outline of the speaker in each camera view. Since heads are defined as ellipsoids by the system, they appear as ellipses when projected into the camera views. The purpose of the visual segmentation step is to evaluate the ellipse regions in each camera view where the active speaker's head is located. The visual segmentation component of the system then outputs;

(m) A set of 2D ellipsoid locations in each camera view corresponding to the head location of the tracked active speaker.

(11) Best-View Selection

The elliptical regions from output (m) enable the speaker's head region to be segmented in the skin colour masks $S_n(p)$ of each view. Using this information, the system evaluates which of the ellipses encompasses the largest number of skin colour pixels. The view corresponding to this ellipse is then classified as the best view of the speaker. The premise in this classification scheme is that the most frontal view of a speaker's face will contain the most visible skin. This view is then cropped about the location of the active speaker's head which forms output;

(n) Segmented frontal view of the active speaker's face.

(12) Compose Composite View

Block (12) retrieves the segmented view of the active speaker from output (n) and embeds this view into a predefined main lecture view. The main lecture view is specified by the user which can change over time or remain constant for the duration of the capture. The final output of the system is;

(o) A single view video presentation consisting of a user defined main view and an inserted front facial view of the current active speaker.

The embodiments in the invention described with reference to the drawings comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a floppy disk or hard disk. The carrier may be an electrical or optical signal which may be transmitted via an electrical or an optical cable or by radio or other means.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. A method for the automated production of a single video file from a multi-view video capture, the method comprising the steps of:
   i) gathering video data from a plurality of camera sources;
   ii) gathering audio data from a plurality of microphone sources;
   iii) using audio and video information to automatically locate and track a moving target object in a 3D space, so as to determine the region occupied by the said target object in each available camera;
   iv) determining from the identified regions in each camera view, the most optimum view of said target object;
   v) modelling skin colour under varying illumination;
   vi) analysing 3D foreground denoting possible target object occupancy from which individual regions of the foreground can be determined through a 3D connect component and shape analysis; and
   vii) composing a single view video sequence consisting of a user defined main view and an automatically inserted optimum view of said target object over the duration of the video capture.

2. The method as claimed in claim 1 wherein the target object is a person.

3. The method as claimed in claim 1 wherein the 3D space is a lecture theatre, seminar room or auditorium.

4. The method as claimed in claim 1 comprising the step of employing voxelization to spatially sample the 3D space of the tracking environment in order to determine hypothesised target object positions.

5. The method as claimed in claim 4 wherein each voxel represents a hypothesised target object position which is confirmed or rejected dependent on a predefined criteria.

6. The method as claimed in claim 4 wherein each voxel represents a hypothesised target object position which is confirmed or rejected dependent on a predefined criteria and said predefined criteria comprises a skin colour mask obtained from multiple camera views to indicate likely regions of person occupancy.

7. The method as claimed in claim 1 comprising the step of using a 2D connected component analysis on each skin colour mask to enable individual connected 3D foreground regions to be associated with connected skin colour regions in each view.

8. The method as claimed in claim 1 comprising the step of defining an ellipsoidal head model and constraining the fitting of the ellipsoid to the 3D foreground corresponding said target object as well as its corresponding connected skin region in each view.

9. The method as claimed in claim 1 wherein the target object is a person, comprising the step of resolving the location of the current active speaker from a plurality of identified head positions using a plurality of time-delay estimates obtained from multiple pairs of microphones.

10. The method as claimed in claim 1 wherein said modelling step is performed for skin colour detection under conditions of low illumination.

11. The method as claimed in claim 1 comprising the step of examining object activity over a window of a pre-defined number of time steps centred at the current time instance to assign a high probability to target object positions which correspond to significant target object activity.

12. The method as claimed in claim 1 comprising the step of examining object activity over a window of a pre-defined number of time steps centered at the current time instance to assign a high probability to target object positions which correspond to significant target object activity, wherein said target object is a person and activity corresponds to speech activity.

13. The method as claimed in claim 1 comprising the step of using the Viterbi algorithm to obtain a Maximum a Posteriori (MAP) estimate of the path of the target object activity through the identified plurality of target object positions over the duration of audio and video capture.

14. The method as claimed in claim 1 comprising the further step of segmenting said target object in each available view and using a best-view selection criteria to determine the most optimum segmented view displaying the target object.

15. The method as claimed in claim 1 comprising the further step of segmenting said target object in each available view and using a best-view selection criteria to determine the most optimum segmented view displaying the target object where the target object is a person and the best-view selection criteria is determined as the segmented head view corresponding to that in which the largest area of detected skin is visible.

16. A non-transitory computer readable medium for the automated production of a single video file from a multi-view video capture, the computer readable medium comprising code for:
  i) gathering video data from a plurality of camera sources;
  ii) gathering audio data from a plurality of microphone sources;
  iii) using audio and video information to automatically locate and track a moving target object in a 3D space, so as to determine the region occupied by the said target object in each available camera;
  iv) determining from the identified regions in each camera view, the most optimum view of said target object;
  v) modelling skin colour under varying illumination;
  vi) analysing 3D foreground denoting possible target object occupancy from which individual regions of the foreground can be determined through a 3D connect component and shape analysis; and
  vii) composing a single view video sequence consisting of a user defined main view and an automatically inserted optimum view of said target object over the duration of the video capture.

* * * * *